US012754156B2

(12) United States Patent
Kurth et al.

(10) Patent No.: US 12,754,156 B2
(45) Date of Patent: Oct. 6, 2026

(54) ELECTRODE HOLDER

(71) Applicant: Mettler-Toledo Instruments (Shanghai) Co., Ltd., Shanghai (CN)

(72) Inventors: Patrick Kurth, Dussnang (CH); Silvan Lüthi, Kollbrunn (CH); Mike Treyer, Nänikon (CH); Peng Wei, Shanghai (CN); Wang Heqiao, Shanghai (CN); He Bing, Shanghai (CN)

(73) Assignee: Mettler-Toledo Instruments (Shanghai) Co., Ltd., Shanghai (CN)

( * ) Notice: Subject to any disclaimer, the term of this patent is extended or adjusted under 35 U.S.C. 154(b) by 910 days.

(21) Appl. No.: 18/070,068

(22) Filed: Nov. 28, 2022

(65) Prior Publication Data

US 2024/0175840 A1 May 30, 2024

(51) Int. Cl.
*G01N 27/28* (2006.01)
*G01N 27/416* (2006.01)

(52) U.S. Cl.
CPC ....... *G01N 27/283* (2013.01); *G01N 27/4167* (2013.01)

(58) Field of Classification Search
CPC ...... G01N 27/283; G01N 27/30; G01N 27/32; G01N 27/327; G01N 27/4167
See application file for complete search history.

(56) References Cited

U.S. PATENT DOCUMENTS 5,603,817 A 2/1997 Settler et al.

FOREIGN PATENT DOCUMENTS

| | | | | | |
|---|---|---|---|---|---|
| CN | 206286696 U | * | 6/2017 | | |
| CN | 206818650 U | * | 12/2017 | | |
| CN | 208689003 U | | 4/2019 | | |
| CN | 214893370 U | | 11/2021 | | |
| CN | 215525627 U | | 1/2022 | | |
| JP | 2005257425 A | * | 9/2005 | ........... | G01N 27/745 |

OTHER PUBLICATIONS

Mettler Toledo, Electrode Arm EasyPlace Complete, https://www.mt.com/us/en/home/products/Laboratory_Analytics_Browse/pH-meter/pH-accessories/electrode-arm-easyplace-complete.html#overviewpm, Mar. 11, 2022, 5 pages.

Youtube, Good pH Practices, SevenDirect™How-to (⅙): pH Meter Installation and Setup, Laboratory Solutions from Mettler Toledo, https://www.youtube.com/watch?v=qBzOdQ7btgg&t=91s, Mar. 11, 2022, 1 page.

* cited by examiner

*Primary Examiner* — Hung D Nguyen

(74) *Attorney, Agent, or Firm* — Standley Law Group LLP; Jeffrey S. Standley; Adam J. Smith

(57) ABSTRACT

An electrode holder includes a bottom plate and an electrode arm. The bottom plate includes at least one coupling structure for mounting a container or a sachet holder to it in a defined positional relation to the electrode arm. The electrode arm includes a clamp to hold an electrode and is equipped to guide the electrode held by the clamp to a container or sachet holder mounted to the at least one coupling structure.

16 Claims, 4 Drawing Sheets

ELECTRODE HOLDER

TECHNICAL FIELD

The invention relates to the field of electrode holders, in particular to an electrode holder comprising an electrode arm and a bottom plate.

The invention further relates to the field of containers and sachet holders for holding sample and/or calibration and/or rising and/or storage liquids for electrodes. These liquids are summarized as "liquids of interest" in the following.

"Electrode" refers for the purpose of this text to an elongated sensor which has a tip which is dipped into a sample liquid and which can determine at least one property of the sample liquid. In the following, this position of the electrode with respect of the liquid of interest is called "measurement position", although it is not restricted to a measurement but may also occur while calibration, rising and/or storing.

The electrode is preferably one of the following types of sensors: A pH-sensor, a redox sensor, an ion sensor, a conductivity sensor, a sensor to determine dissolved oxygen, carbon dioxide, ozone, a sensor to measure the turbidity. Preferably, the measurement is done by detecting an electrical potential difference between two conductors arranged in or on of the sensor tip. Most preferably, the "electrode" is a pH-sensor which uses a pH-sensitive glass.

To calibrate, conduct measurements and/or store such electrodes, they need to be dipped in many cases subsequently into different liquids of interest.

It is the purpose of the electrode holder to assist the user with moving the electrode and to ensure that the electrode remains in the measurement position without touching the walls of the container containing the liquid. The container containing the liquid is preferably a beaker or a sachet. In some embodiment, an additional beaker is arranged inside a container, for example to avoid contamination of the liquid by the container walls.

A sachet is a package made of flexible foil and comprises the liquid of interest.

Sachets to be used in the invention at hand have preferably a shape and dimensions which allows to bring the electrode in a measurement position within them. In the prior art, sachets are often emptied into a beaker and the electrode is brought in the measurement position with respect to the liquid of interest in the beaker. In closed form, the sachet is used to ship and store the liquid of interest. The sachets for this invention are arranged in holders once they are opened to prevent spilling and to define their shape and orientation. Sachet for this invention comprise typically calibration liquids such as pH-buffers to calibrate pH-sensors as electrodes.

In many cases, it is desirable to work only with small amounts of the liquids of interest. To ensure that the sensor tip is surrounded up to the desired level with the liquid of interest in the measurement position, containers with a small cross-section compared to their height are desirable. However, such containers increase the risk of being tipped over, if the electrode touches the wall of the container during insertion or extraction of the electrode.

BACKGROUND ART

The electrode generally needs to be fixed by a clamp during measurement to keep its tip in the desired position within the liquid of interest. Ordinary clamps are often inconvenient to use, and at the same time, the electrode tube is relatively fragile and easy to be crushed by tight clamping. Therefore, it is desirable to use an electrode arm to which the electrode can be mounted before it is positioned with respect to the liquid of interest and which is suitable to hold the electrode during measurement in this position.

CN208689003U discloses a desk-top pH-meter support: the electrodes are fixed with screws to an adapter which is arranged on a horizontal bridge. The adapter can be positioned along this horizontal bridge and fixed in a desired position by a second screw. Two vertical supports hold the horizontal bridge which can be moved in vertical direction along these vertical supports. While this system allows to position a plurality of electrodes at once, repositioning requires opening and tightening of many screws. Therefore the freedom of the operator and the speed to do the repositioning is limited.

There is no structure in the prior art electrode holders which assists with positioning, by defining specific measurement positions in advance. Instead, a specific measurement position needs to be adjusted repeatedly for every measurement, which is not convenient enough to use.

The calibration process using standard buffer solutions provided in packs or sachets is described in U.S. Pat. No. 5,603,817A. The document teaches that the packs are flat foil envelopes comprising an internal pad to keep them in flat condition. The document discloses a support block with parallel slots to accommodate the bottom edges of the packs. While containers with liquids of interest can be arranged within this support, neither the containers themselves nor the support assists the user with the task of inserting the electrode into the buffer solutions within the packs. The document is silent about inserting the electrode into the packs and therefore, one has to assume that the content of the packs is in this embodiment filled in an additional beaker to do the desired calibration.

In the prior art, the user has to apply an electrode moisturizing cap comprising the storage liquid when he wants to make a break and when the electrode at hand requires to be stored in a storage liquid. Therefore such a moisturizing cap has to be stored somewhere close to the place where the measurements are conducted. Many sachets cannot stand upright, and are typically stored in a paperboard holder somewhere on the laboratory table. Alternatively, the calibration and rinsing liquids are provided in bottles and small amounts of it are filled in beakers. The amount of containers comprising liquids on the laboratory table is therefore large and makes the test site messy, increasing the risk of mix-ups and spilling.

SUMMARY OF INVENTION

The technical problem to be solved by the invention is to overcome the defects in the prior art which is to assist the user efficiently in moving the electrode from one container to the next, reducing the risk of spilling liquids.

This is archived with the features of the independent claims.

An electrode holder according to the invention comprises a bottom plate and an electrode arm. The bottom plate comprises at least one coupling structure for mounting a container or a sachet holder to it in a defined positional relation to the electrode arm. The electrode arm comprises a clamp to hold an electrode. The electrode arm is equipped to guide the electrode held by the clamp to a container or sachet holder mounted to the at least one coupling structure.

By providing the coupling structure and electrode arm in the same device, the positioning of the containers, either in the form of a container mounted directly to the coupling structure or in the form of sachets positioned by sachet holders mounted to the coupling structure, is known when constructing the electrode arm. This implies that also the measurement positions are pre-defined. This allows to design the electrode arm such that it can guide the user to arrange the electrode to the measurement positions, for example by at least temporarily restricting the degrees of freedom of motion or by giving haptically feedback to the user.

Preferably, the electrode holder comprises more than one coupling structure for mounting a container or a sachet holder to it. At least a subset of two or more of the coupling structures are arranged on a circle, preferably with a centre on the bottom plate.

This arrangement allows to provide multiple measurement positions and to reach them by turning at least a part of the electrode arm around a rotation axis which runs through the centre of the circle and is perpendicular to the bottom plate. This facilitates the construction of the electrode arm with the desired guiding function.

Preferably, the electrode holder comprises more than one coupling structure for mounting a container or a sachet holder to it. In this embodiment a first set of coupling structures for mounting a first type of container or sachet holders differs from a second set of coupling structures for mounting a second type of container or sachet holders. The coupling structures belonging to the first set of coupling structures are arranged on a first circle. The coupling structures belonging to the second set of coupling structures are arranged on a second circle. The centre of the first and the second circle are the same and but the radii of the first and the second circle differ.

This embodiment allows to couple containers and sachet holders to the electrode holder which differ in the distance between their second coupling structure and the pace where the electrode should be in the measurement position of the specific container or sachet holder. As the centres of the two circles are the same, the turning part of the electrode arm, preferably the rotating member, does not need to be changed or adapted to the different types of containers or sachet holders. The fact that the coupling structures differ, prevents a mix-up when arranging containers or sachet holders on the bottom plate.

Preferably, the at least one coupling structure is a round hole. Thereby the coupling structure is rotational symmetric and has a shape which is easy to clean. A first and a second set of coupling structures can be distinguished by the radius of the holes.

In one embodiment, the at least one coupling structure is rotational symmetric around a coupling axis. At least one magnet is arranged on the underside of the bottom plate in the vicinity of the at least one coupling structure.

The rotational symmetric coupling structure can act together with a rotational symmetric second coupling structure on the container or sachet holder to result in a coupling which allows the rotation of the container or the sachet holder while being mounted to the bottom plate. This is useful if a container or sachet holder comprises more than one compartment and the rotation can be used to choose one of them. The magnet can interact with a magnet arranged in the container or sachet holder to increase the resistance once a desired relative position between container or sachet holder and bottom plate is chosen. A marking may be applied to bottom plate and container or sachet holder to also give a visual indication of such preferred relative positions.

In a preferred embodiment, the at least one coupling structure is rotational symmetric around a coupling axis. Three magnets are arranged evenly on a circle with a centre defined by the coupling axis and a first radius.

A calibration is often done with two or three liquids with defined properties. It is convenient for the user to have all calibration liquids arranged in a single container or sachet holder. Therefore, containers and sachet holders which three compartments are particular useful and consequently they have three preferred relative positions,—one for every compartment. By using three magnets arranged as claimed, there are three positions in which magnets arranged on the container or sachet holder can interact with the magnet on the bottom plate and therefore all preferred relative positions can be marked by the magnetic force noticeable by the user and preventing an undesired repositioning of the container or sachet holder.

Preferably, the electrode arm comprises a vertical support, a rotating member and a clamp. The vertical support is arranged vertically on the bottom plate. The rotating member can be moved in vertical direction, preferably between an upper and a lower limit stop adjustable by the user. The rotating member can turn around a rotation axis which is vertical and which is fixed with respect to the bottom plate.

This construction of an electrode arm guides an electrode held by the clamp efficiently from one measurement position to the next. The vertical support ensure that the electrode can be moved easily in the vertical direction. This prevents a collision with the container walls, resulting in spilling or damage of the electrode, during the insertion or extraction of the electrode from the measurement position. By turning the rotating member, different measurement positions can be reached.

In a preferred embodiment, the rotation axis of the rotating member runs through the centre of the circle on which the more than one coupling structure for mounting a container or a sachet holder are arranged. This allows to guide the electrode to the measurement positions defined by the coupling structure in the bottom plate and the design of the containers or sachet holders coupled to it.

In a preferred embodiment, the electrode arm comprises a rotating base which is connected with the rotating member through a rotating structure defining the rotation axis of the rotating member. The rotating base is guided by the vertical support.

This allows to move the rotation axis of the rotating member away from the vertical support. This reduces the obstructions of the vertical support to the turning motion of the rotating member and/or the user and allows to arrange the coupling structures in a convenient and well accessible way with respect to the vertical support.

Preferably, the rotating structure is a double-bearing rotating structure which includes a first bearing, a second bearing and a positioning member. The first bearing is installed between the rotating base and the rotating member. The second bearing is installed in the rotating member. The rotating member and the rotating base are connected through the positioning member, in such a way that during the rotating process of the rotating member, the positioning member and the rotating base are kept fixed with respect to each other.

This arrangement is particular reliable and gives a precise guidance of the rotating member.

Preferably, a first mounting groove is formed on an upper end surface of the rotating member. A second mounting groove is formed on a lower end surface of the rotating member. The first mounting groove and the second mounting groove are connected through a connecting through hole. The lower end surface of the rotating base is provided with a downwardly protruding mounting base. The first bearing is installed in the first mounting groove. The mounting base is mounted to the first bearing. The second bearing is installed in the second mounting groove. The positioning member is connected to the mounting base, extending thereby through the second bearing and the connecting through hole.

Preferably, an inner ring of the first bearing is matched with the mounting base of the rotating base, and an outer ring of the first bearing is matched with the first mounting groove of the rotating member.

Preferably, the positioning member is a fastening screw.

Preferably, a threaded structure is provided in the mounting base. The fastening screw is connected with the threaded structure of the mounting base.

Preferably, the first bearing is a deep groove ball bearing, and the second bearing is a plane bearing.

Preferably, a multi-point positioning structure is provided between the rotating base and the rotating member. The multi-point positioning structure defines one coordinate of multiple, predefined, specific measurement positions.

The electrode holder preferably defines, together with the containers or sample holder coupled to it, the coordinates of the measurement positions, which are most conveniently given in cylindrical coordinates relative to the rotation axis of the rotating member.

The height coordinate is preferably given by design of the bottom and the height of compartments of the containers or sample holders to be coupled to the bottom plate, the length of the electrode and its tip and it is controlled by the lower limit stop for the vertical motion of the rotating member respectively the rotating base.

The radius coordinate is preferably given by the placement of the compartments of the containers or sample holders to be coupled to the bottom plate relative to their second coupling structure and the arrangement of the coupling structures of the bottom plate, more precisely the radius of the circle in which they are preferably arranged. This coordinate is controlled by the length of the rotating member and the clamp.

In this embodiment, the angular coordinate is given by the arrangement of the coupling structures on the bottom plate and controlled by the multi-point positioning structure.

As the design of the containers and/or sample holders is known to the producer of the electrode holder, the electrode holder can be adapted by the manufacturer to guide the user to the radius und angular coordinates predefined by the combination of bottom place the container/sample holder. The manufacturer may also set a lower limit stop in vertical direction to give a pre-set guidance to the user of electrodes of a standard length. As the user might want to use the electrode holder with sensors of different length, this lower limit stop is preferably adaptable by the user. The lower limit stop can be realised by a pin arranged on the vertical support such that the rotating base contacts it and is stopped in its downward motion along the vertical support.

The multi-point positioning structure is preferably realized by providing a mounting hole on the lower end surface of the rotating base and providing a positioning component in the mounting hole. A plurality of positioning holes surrounds the first bearing on the surface of the rotating member. The positioning component is such that it can engage with every one of the positioning holes one at a time.

The positioning component is preferably a positioning bead, a positioning elastic sheet or a ball plunger.

Preferably, the positioning holes and the rotating member are integrally formed by injection-moulding, or the positioning holes are openings in a positioning plate, and the positioning plate is mounted on the rotating member.

Container or sachet holder for use with the electrode holder comprises a cylindrical compartment. The compartment is open on the upper side and closed on the bottom. It is suitable to receive a sachet or a liquid. The container or sachet holder further comprises a second coupling structure arranged on the bottom of the container or sachet holder and which can be coupled to the at least one coupling structure in the bottom plate.

Therefore, the container or sachet holder can be coupled to the electrode holder. The at least one compartment of the container or sachet holder defines, together with the electrode holder and the electrode attached to it, the measurement position.

Preferably, the second coupling structure is rotational symmetric around a second coupling axis. Preferably the second coupling structure is formed by latches arranged on a circle with a centre defined by the second coupling axis, such that a snap-in joint can be formed upon interaction with a coupling structure in the shape of a round hole.

Such a snap-in joint allows to form a secure but toolless removeable connection. Further if allows a rotation of the container or sachet holder around the second coupling axis when mounted.

Preferably, the sachet holder comprises more than one equally dimensioned cylindrical compartment. These compartments are arranged side by side in parallel to each other and symmetrically around the second coupling axis. Preferably, the second coupling axis is also a symmetry axis of the second coupling structure.

Preferably the cross-sections of the compartment perpendicular to the second coupling axis are sectors of a circle. Most preferably, the sachet holder comprises three compartments, each of them having a cross-section of a 120°-sector of a common circle. If was found that these 120°-sectors of circle support suitable sachets in such a way that once their cut open along one of their smaller edges, they open under the weight of the liquid inside to such an extent that the electrode can be easily inserted without touching the walls of the sachet. At the same time, the walls of the sachet holder stabilize the sachet in this position. Preferably, the length of the smaller edge of the sachet is between 0.8 and 1 times the chord of the circle segment.

Preferably, the sachet holder comprises at least one magnet arranged in the bottom of one of the compartments in a second distance from the second coupling axis. The sachet holder preferably comprises three compartments and three magnets arranged evenly on a circle with a centre defined by the second coupling axis and a second radius and whereby every magnet is associated with a compartment.

Together with at least one magnet arranged on the bottom plate, this allows to define and secure a desired position of a compartment relative to the electrode arm and thereby the choice of the compartment arranged at the measurement position.

A set comprises the electrode holder and at least one container or sachet holder. The container or sachet holder is removably mounted to the bottom plate by the interaction of the first coupling structure and the second coupling structure.

Preferably, the electrode holder comprises more than one coupling structure for mounting a container or a sachet holder to it. The more than one container or sachet holder is removably mounted to the electrode holder. The coupling structures and the container and/or sachet holders mounted to it are arranged and dimensioned such that measurement positions are on a circle with a centre being on the rotation axis of the rotating member.

The measurement positions are preferably the positions at which the electrode is expected to be during measurement, rinsing, calibration and/or storage.

As explained above, these features can be fulfilled by sorting containers and sample holder in types which are characterized by having the same distance between their compartments and their second coupling structure. The distance is preferably measured between the second coupling axis and the intended measurement position in the compartment. The second coupling structures of containers and samples of the same type is the same and differs from the second coupling structures of containers and sample holders of a different type. The corresponding coupling structures on the bottom plate are arranged on circles with a common centre but radii which differ by the distances between the compartments and the second coupling structure.

In one embodiment, the sachet holder is removably mounted to the bottom plate by the interaction of the first coupling structure and the second coupling structure. The first and the second coupling axis are aligned and the first and the second radius are the same. Thereby the at least one magnet in the bottom of one of the compartments is attracted by the at least one magnet on the underside of the bottom plate. This fixes a desired orientation of the sachet holder relative to the electrode arm by the magnetic attraction.

The positive and progressive effects of the invention are:

The electrode holder according to the invention with a sachet holder can provide a plurality of specific calibration buffers and allows a rapid positioning of the specific calibration buffer at a measurement position of the electrode. The electrode holder according to the invention with a container allows to provide a compartment holding a storage liquid such as the one commonly provided in a moisturizing cap and/or buffer solution handy for the user. The guidance to the user helps to prevent spilling liquids during use. Therefore the electrode holder conveniently reduces electrode calibration time when multiple calibration points and therefore multiple calibration liquids are required.

DESCRIPTION OF EMBODIMENTS

Figure 1A:
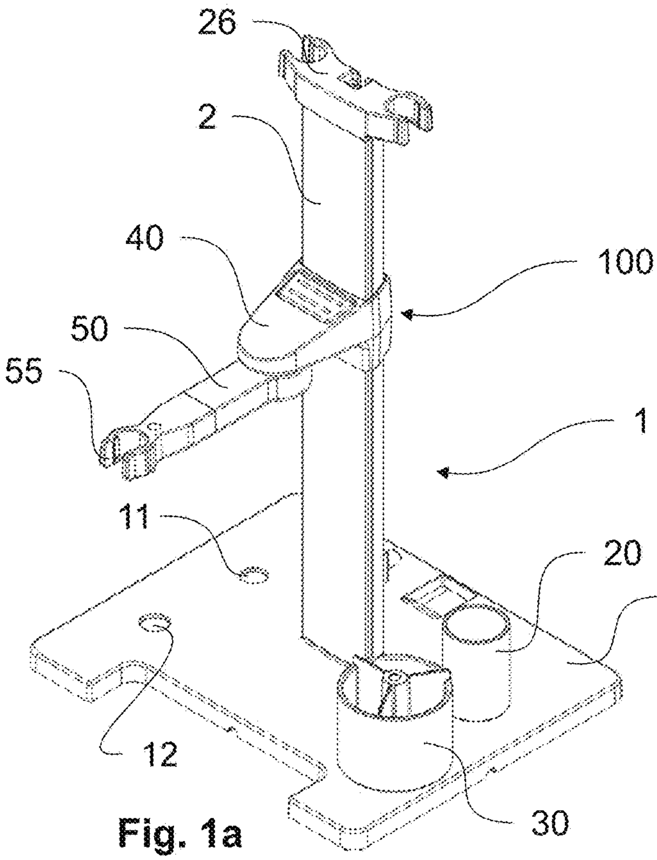
FIG. 1*a* shows the electrode holder of the present invention.
Figure 1B:
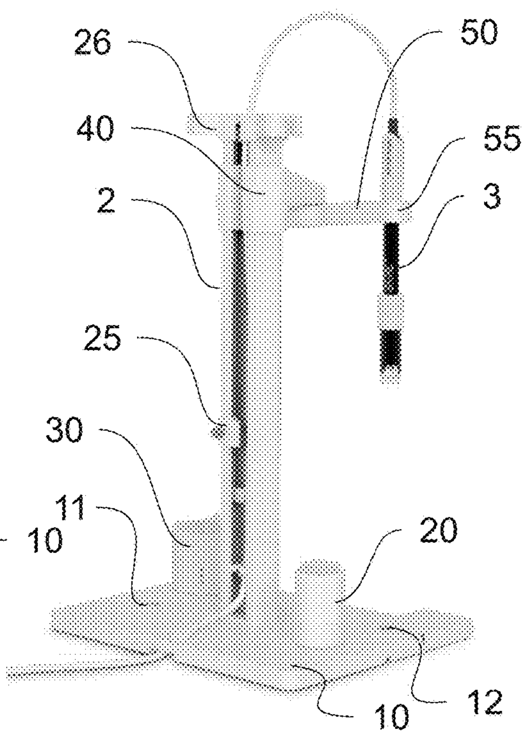
FIG. 1*b* shows the electrode holder of the present invention with an electrode.

FIGS. 1*a* and *b* shows the electrode holder 1 with the vertical support 2 mounted on the bottom plate 10 from two different views. The bottom plate 10 comprises in total four coupling structures 11 and 12. Visible are a coupling structure of a first set 11 with a smaller diameter and a coupling structure of a second set 12 with a larger diameter. The other two coupling structures are used to mount a sachet holder 30 and a container 20 to the bottom plate 10. The coupling structures 11 and 12 are circular holes. The vertical support 2 stands vertically on the horizontal bottom plate 10. A rotating base 40 is in movable contact with the vertical support 2 such that is can move along the vertical support 2 between an upper and a lower limit stop 25. A rotating member 50 is mounted to the rotating base 40. A clamp 55 to hold an electrode 3 is arranged at the end of the rotating member 50. In FIG. 1*b*, the electrode 3 is arranged in the clamp 55. The vertical support 2, the rotating base 40, the rotating member 50 and the clamp 55 form the electrode arm 100. Together with the bottom plate 10, they form the electrode holder 1.

In FIG. 1*a*, one can see that the sachet holder 30 comprises three compartments which all have the shape of 120°-sectors of a circular cylinder.

Figure 1C:
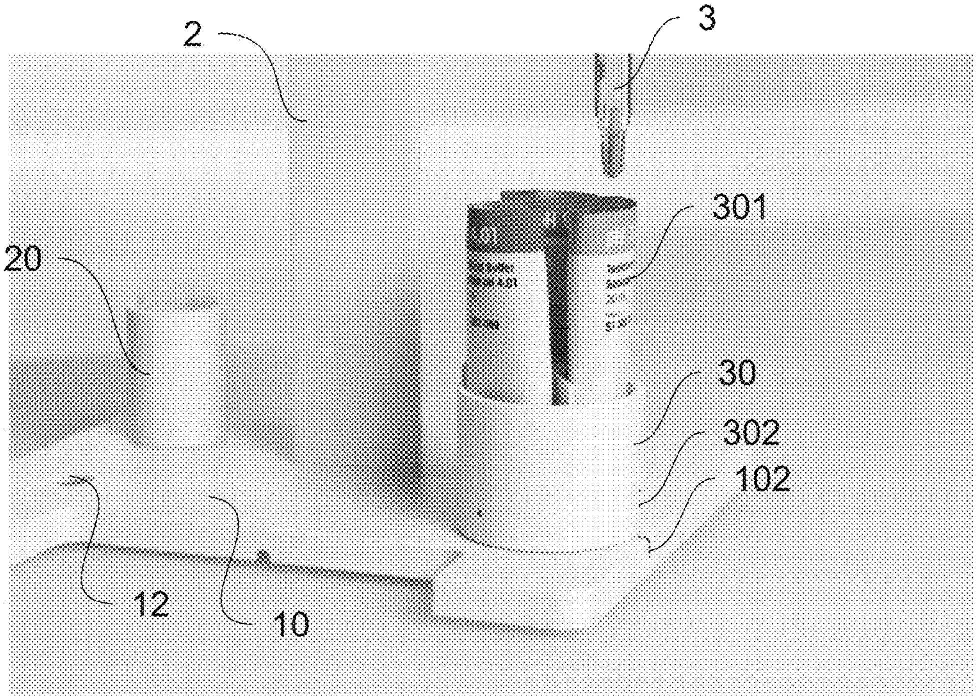
FIG. 1*c* shows sachets arranged in a sachet holder and the electrode on the way toward a measuring position.

FIG. 1*c* shows a close up of the bottom plate 10 with a container 20 and a sachet holder 30 mounted to two coupling structures provided in the bottom plate 10. A third coupling structure 12 in the shape of a circular hole is visible. The vertical support 2 extends vertically up from the bottom plate 10. Three sachets 301 are arranged in the three different compartments of the sachet holder 30. The sachets 301 are open on the upper end and have a shape which allows the insertion of the electrode 3. The sachet holder 30 comprises a marking 302. If the sachet holder is in a desired position, which is preferably a position in which a compartment is in a measurement position for the electrode, the marking 302 on the sachet holder 30 is in the vicinity of a marking 102 on the bottom plate 10.

Figure 2:
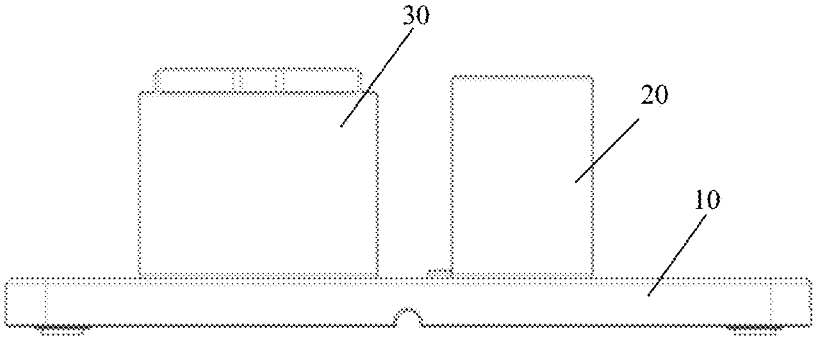
FIG. 2 is a side view of a bottom plate of an electrode holder with mounted sachet holder and container.

FIG. 2 is a schematic structural view of a bottom plate 10 of the present invention with a sachet holder 30 and a container 20 mounted to it.

Figure 3:
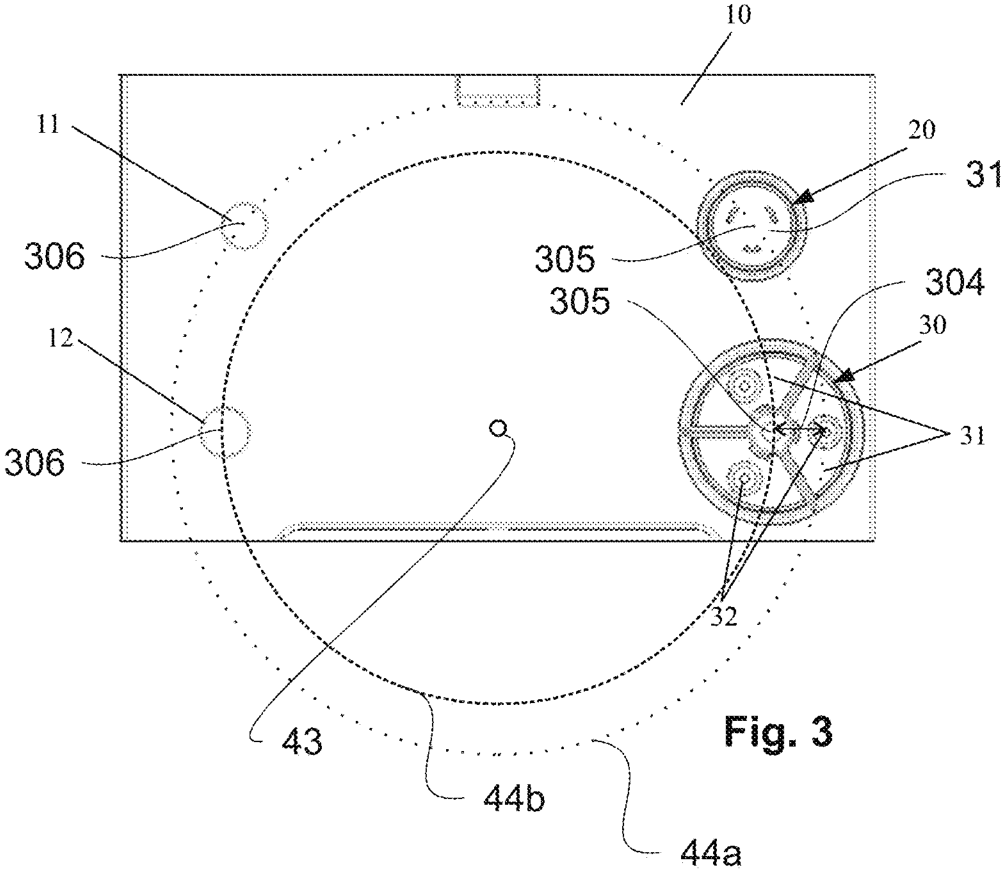
FIG. 3 is a top view of the bottom plate the electrode holder with mounted sachet holder and container.

FIG. 3 is a top view of the bottom plate 10. In this view, the circular shape and the difference in the diameter between the coupling structure of the first set 11 and the coupling structures of the second set 12 are clearly visible. Further, the compartments 31 of the sachet holder 30 in the shape of 120°-sectors is clearly visible. The container 20 has in this embodiment only a single compartment 31. FIG. 3 shows in addition the location of magnets 32: below every one of the three compartments 31 of the sachet holder 30, there is a magnet 32. The location and size of the magnet 32 is below the position where the electrode will be, when it is in its measurement position. The distance 304 between this position and the second coupling axis 305 is indicated by an arrow in FIG. 3. The second coupling axis 305 is the symmetry axis 305 of the second coupling structure 311 of the sachet holder 30. In the case of the container 20, the second coupling axis 305 runs through the position where the electrode will be when it is in its measurement position and therefore the distance 304 is zero and cannot be shown. When the sachet holder 30 or the container 20 are mounted to the bottom plate 10, their second coupling axis 305 overlaps with the coupling axis 306 of the coupling structure 11,12 of the bottom plate.

As the distance 304 is zero in the case of the container 20 and non-zero in the case if the sachet holder 30 in the illustration, the container 20 belongs to a different type of container or sachet holders than the sachet holder 30. Consequently, their second coupling structures differ and so do the coupling structures 11, 12 in the bottom plate. The four coupling structures 11, 12 on the illustrated bottom plate 10 can be grouped into two set: the first set of coupling structures 11 which are suitable to mount containers or sachet holders with a distance 304 of zero and a second set of coupling structure 12 which are suitable to mount containers of sachet holder with a distance 304 equal to the one of the illustrated sachet holder 30. All coupling structures of a set are arranged on a circle. In the illustrated case, there are two circles indicated by dashed lines. The first set of coupling structures 11 is arranged on the outer circle 44*a* while the second set of coupling structures 12 is arranged on the inner circle 44*b*. Both circles 44*a*, and 44*b* have the same centre and their radius differs by the distance 304. The rotation axis 43 around which the rotating member 50 turns crosses this centre of the two circles. This arrangement of the coupling structures 11,12 ensures that the distance between the rotation axis 43 and the measurement positions is for all containers 20 and sachet holders 30 the same.

Figure 4:
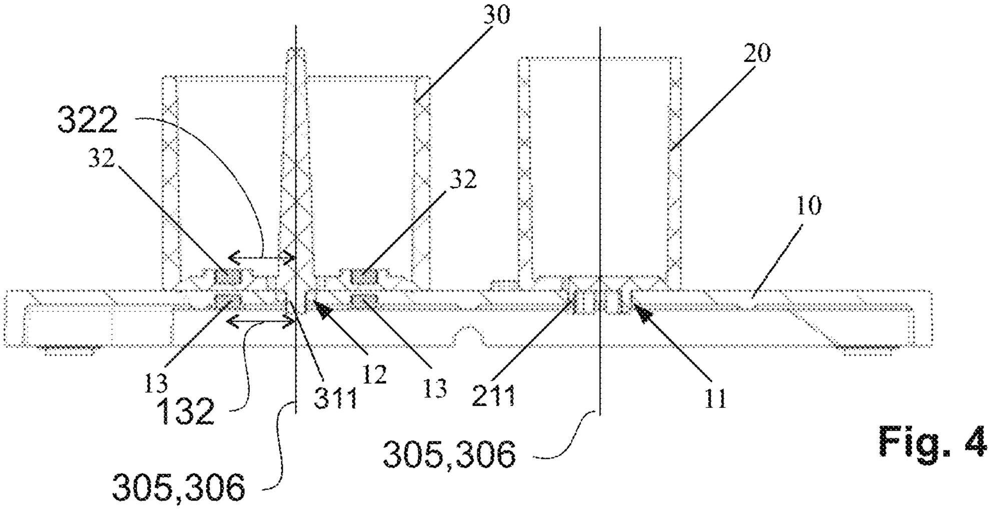
FIG. 4 is a longitudinal cross-sectional view of the bottom plate of the electrode holder with mounted sachet holder and container.

FIG. 4 is a longitudinal cross-sectional view of the bottom plate 10. In this view, the arrangement of the magnets 32 in the bottom of the sachet holder 30 and the magnets 13 in bottom plate 10 is visible: The magnets 13 of the bottom plate 10 are arranged on a circle surrounding the coupling axis 305 with a first radius 132. The magnet 32 of the sachet holder 30 are arranged on a circle surrounding the second coupling axis 306 with a second radius 322. The first radius 132 equals the second radius 322 and, in the mounted state, the coupling axis 306 coincides with the second coupling axis 305. Therefore, the magnets 32 and 13 can be arranged in such a way that they have their closest approach when the orientation or position of the sachet holder 30 is such that the measurement position which can be reached by an electrode 3 held by the clamp 55 of the electrode holder 10 coincides with a compartment of the sachet holder 30.

Figure 5:
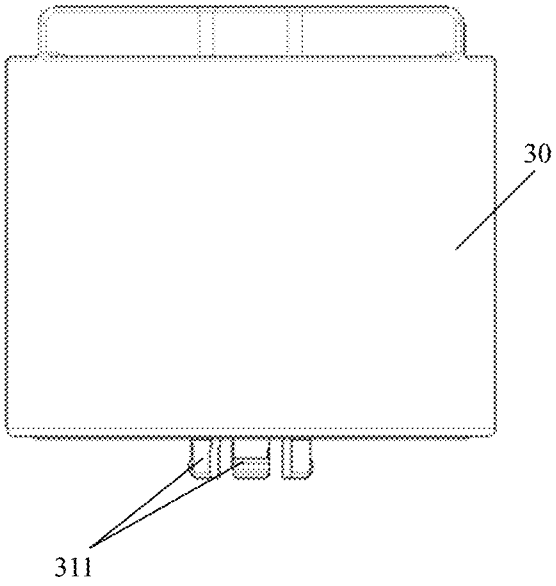
FIG. 5 is a schematic diagram of the structure of the sachet holder.
Figure 6:
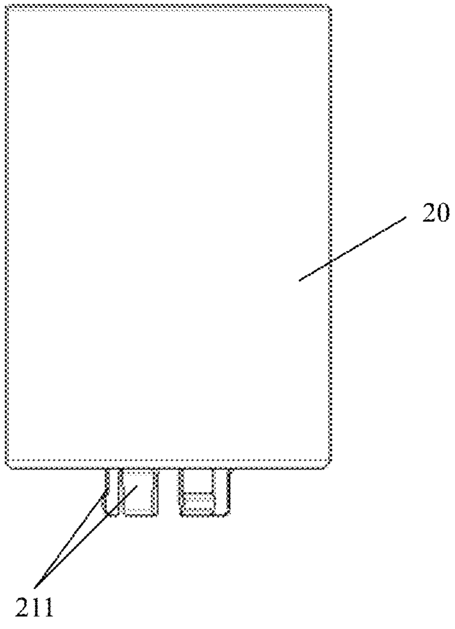
FIG. 6 is a schematic diagram of the structure of the container.

FIG. 5 is a schematic diagram of the structure of the sachet holder 30. FIG. 6 is a schematic diagram of the structure of the container 20. In both cases, the second coupling structure 311, respectively 211 is visible: It is formed by latches arranged on a circle with a centre defined by the second coupling axis 305 such that a snap-in joint can be formed upon interaction with the coupling structure 11 or 12 of the bottom plate 10 in the shape of a round hole.

Figure 7:
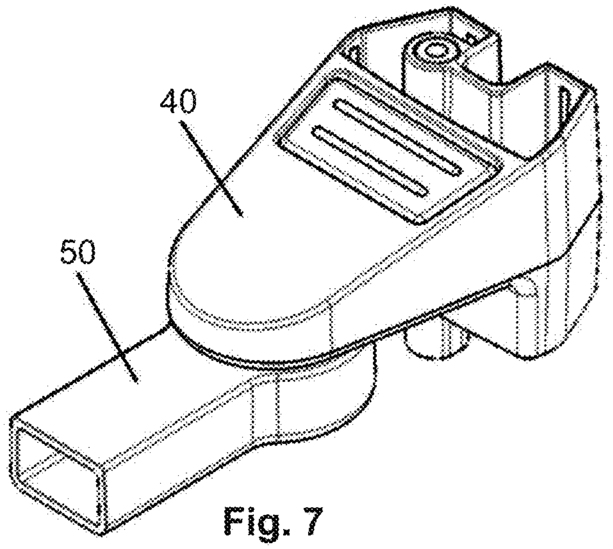
FIG. 7 is a schematic structural diagram of the rotating base and the rotating member of the electrode holder.
Figure 10:
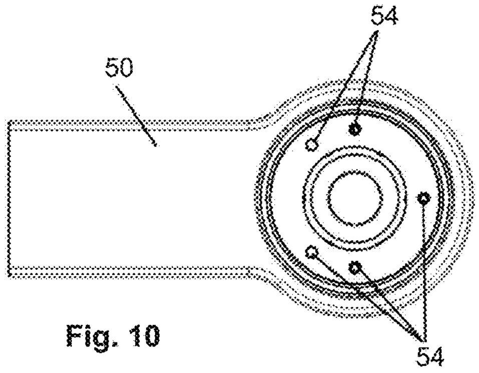
FIG. 10 is a top view of the rotating member of the electrode holder of the present invention
Figure 8:
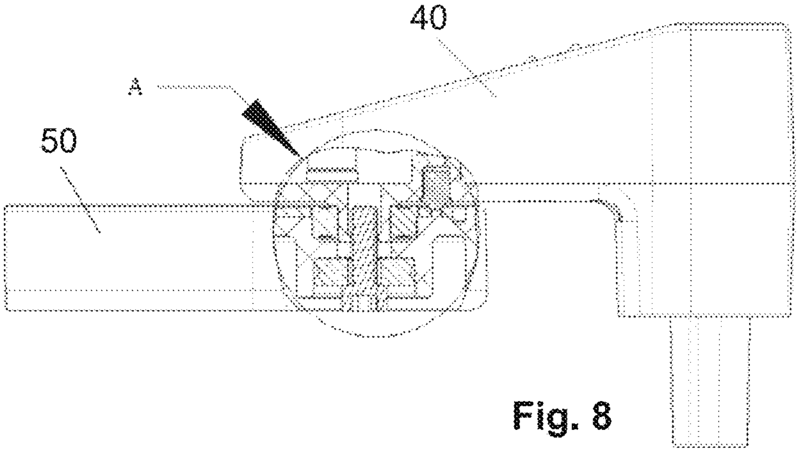
FIG. 8 is a schematic diagram of the connection structure of the rotating base and the rotating member of the electrode holder.
Figure 9:
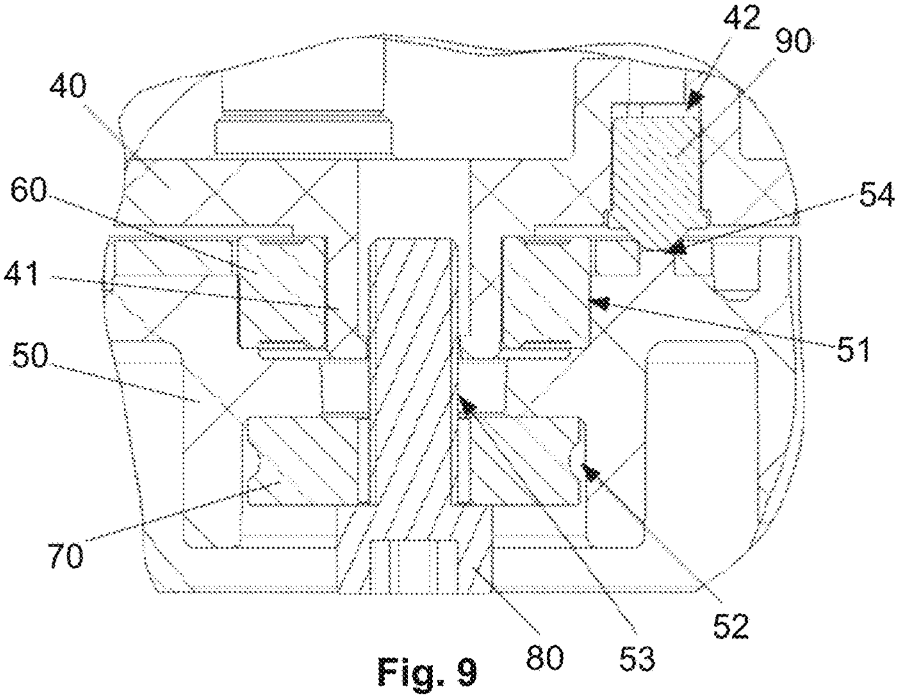
FIG. 9 is an enlarged view of part A in FIG. 8.

FIG. 7 is a schematic structural diagram of part of the electrode arm 100. FIG. 8 is a schematic diagram of the connection structure of the rotating base 40 and the rotating member 50 of the electrode holder 10 of the present invention. FIG. 9 is an enlarged view of part A in FIG. 8. FIG. 10 is a top view of the rotating member 50.

As shown in FIG. 7 to FIG. 10, the present invention discloses an electrode holder 10, which includes a rotating base 40 and a rotating member 50. The rotating base 40 is connected with the rotating member 50 through a double bearing rotating structure. The double-bearing rotating structure comprises a first bearing 60, a second bearing 70 and a positioning member 80. The first bearing 60 is arranged between the rotating base 40 and the rotating member 50. The second bearing 70 is mounted in the rotating member 50. The positioning member 80 is mounted in such a way to the rotating member 50 and the rotating base 40, that during the rotating process of the rotating member 50, the positioning member 80 and the rotating base 40 keep their orientation with respect to each other.

Preferably, a first mounting groove 51 is formed on the upper end surface of the rotating member 50, and a second mounting groove 52 is formed on the lower end surface of the rotating member 50. A connecting through hole 53 connects the first mounting groove 51 and the second mounting groove 52.

Further, the bottom end surface of the rotating base 40 is provided with a downwardly protruding mounting base 41. The first bearing 60 is installed in the first mounting groove 51. The mounting base 41 is mounted to the first bearing 60. The second bearing 70 is installed in the second mounting groove 52, and the positioning member 80 is connected to the mounting base 41 through the second bearing 70 and the connecting through hole 53.

Here, preferably, the inner ring of the first bearing 60 is matched with the mounting base 41 of the rotating base 40, and the outer ring of the first bearing 60 is matched with the first mounting groove 51 of the rotating member 50, so as to connect the rotating member 50 to the rotating base 40.

In particular, the positioning member 80 is a fastening screw. A threaded structure is provided in the mounting base 41, and the fastening screw is screwed into the threaded structure of the mounting base 41. The fastening screw 80 is thereby connected with the thread of the rotating base 40, and the upper end surface of the second bearing 70 is pressed on the rotating member 50. The lower end surface of the second bearing 70 contacts the head of the fastening screw 80. Therefore, the fastening screw 80 will not follow the rotation of the rotating member 50 during the rotation process.

Here, the first bearing 60 is preferably a deep groove ball bearing, and the second bearing 70 is preferably a plane bearing. The deep groove ball bearing is in interference fit with the rotating member 50 and the rotating base 40 respectively, and is pressed in by the tooling. The plane bearing is pressed against the rotating member 50 by means of the fastening screw 80 which is screwed into the rotating base 40.

Further, a multi-point positioning structure is provided between the rotating base 40 and the rotating member 50. The multi-point positioning structure realizes a multi-point positioning of the rotating member 50 with respect to the rotating base 40.

A mounting hole 42 is provided on the bottom end surface of the rotating base 40. A positioning component 90 is provided in the mounting hole 42. A plurality of positioning holes 54 are provided on the upper end surface of the rotating member 50. The positioning holes 54 surround the first mounting groove 51. The positioning component 90 is matched with every one of the positioning holes 54 in such a way that it can engage and disengage with it. Here, the positioning component 90 is preferably a positioning bead, a positioning elastic sheet or a ball plunger. During the rotation, the positioning component 90 engages with one of the positioning holes 54 to realize the selection of the respective position.

Preferably, the positioning holes 54 and the rotating member 50 are integrally injection-moulded. In another preferred embodiment, the positioning holes 54 are openings in a positioning plate, and this positioning plate is mounted on the rotating member 50.

According to the above description, the electrode holder 1 of the present invention is connected with the rotating member 50 and the rotating base 40 through the positioning member 80 and through two bearings 60 and 70. The rotating base 40 is in a preferred embodiment equipped with a positioning component 90, which cooperates with the positioning holes 54 on the rotating member 50 to realize the multi-point positioning function. The positioning holes 54 can be an integral structure formed by injection moulding, or a separate positioning plate can be assembled ono the rotating member 50.

To sum up, rotating structure of the electrode holder according to the invention can realize the rotation function stably and smoothly, and at the same time can provide a rapid positioning of the electrode in one out of multiple specific measurement points.

Although the specific embodiments of the present invention are described above, those skilled in the art should understand that these are only examples, and the protection scope of the present invention is defined by the appended claims. Those skilled in the art can make various changes or modifications to these embodiments without departing from the principle and essence of the present invention, but these changes and modifications all fall within the protection scope of the present invention.

| Reference signs list | |
|---|---|
| 1 | Electrode holder |
| 100 | Electrode arm |
| 2 | Vertical support |
| 3 | electrode |
| 25 | Lower limit stop |
| 26 | Upper limit stop |
| 10 | Bottom plate |
| 20 | Container |
| 30 | Sachet holder |
| 301 | Sachet |
| 302 | Marking on Sachet holder |
| 304 | Distance between second coupling axis and compartment |
| 305 | second coupling axis (container/sachet holder) |
| 306 | Coupling axis (bottom plate) |
| 102 | Marking on bottom plate |
| 11 | First set of coupling structures (bottom plate) (for container) |
| 31 | Compartment |
| 12 | Second set of coupling structures (bottom plate) (for sachet holders) |
| 211, 311 | 311: second coupling structure of sachet holder<br>211: second coupling structure of container |
| 32 | Magnets (Sachet holder) |
| 322 | Second distance, second radius (between second coupling axis and magnets) |
| 13 | Magnets (bottom plate) |
| 132 | First radius (between coupling axis and magnets) |
| 40 | Rotating base |
| 41 | Mounting base |
| 42 | Mounting hole |
| 43 | Rotation axis |
| 44a, 44b | Circle on which the coupling structures are arranged |
| 50 | Rotating member |
| 51 | First mounting groove |
| 52 | Second mounting groove |
| 53 | Connecting through hole |
| 90 | Positioning component |
| 54 | Positioning holes |
| 55 | clamp |
| | Double-bearing rotating structure |
| 60 | First bearing |
| 70 | Second bearing |
| 80 | Positioning member |

The invention claimed is:

1. An electrode holder, comprising:

a bottom plate; and an electrode arm;

wherein the bottom plate comprises at least one coupling structure for mounting a container or a sachet holder to it in a defined positional relation to the electrode arm; and wherein the electrode arm comprises a clamp to hold an electrode, and is equipped to guide the electrode held by the clamp to the container or sachet holder mounted to the at least one coupling structure.

2. The electrode holder of claim 1 comprising more than one coupling structure for mounting the container or sachet holder to it, wherein at least a subset of two or more of the coupling structures are arranged on a circle.

3. The electrode holder of claim 1 comprising more than one coupling structure for mounting the container or sachet holder to it, wherein:

a first set of coupling structures for mounting a first type of the container or sachet holder differs from a second set of coupling structures for mounting a second type of the container or sachet holder;

the coupling structures belonging to the first set of coupling structures are arranged on a first circle and the coupling structures belonging to the second set of coupling structures are arranged on a second circle;

the center of the first and the second circle are the same; and the radius of the first and the second circle differs.

4. The electrode holder of claim 1 wherein the at least one coupling structure is a round hole.

5. The electrode holder of claim 1 wherein:

the at least one coupling structure is rotational symmetric around a coupling axis; and at least one magnet is arranged on the underside of the bottom plate in the vicinity of the at least one coupling structure.

6. A set comprising:

the electrode holder of claim 5; and at least one sachet holder for use with the electrode holder, comprising:

a cylindrical compartment which is open on an upper side and closed on a bottom, suitable to receive a sachet or a liquid;

a second coupling structure arranged on the bottom of the container or sachet holder which can be coupled to the at least one coupling structure in the bottom plate; and more than one equally dimensioned cylindrical compartment, arranged side by side in parallel to each other and symmetrically around the second coupling axis, wherein the second coupling axis is also a symmetry axis of the second coupling structure;

wherein:

the sachet holder is removably mounted to the bottom plate by the interaction of the first coupling structure and the second coupling structure;

the first and the second coupling axis are aligned; and the first and the second radius are the same, such that the at least one magnet in the bottom of one of the compartments is attracted by the at least one magnet on the underside of the bottom plate, such that a desired orientation of the sachet holder relative to the electrode arm is fixed by this magnetic attraction.

7. The electrode holder of claim 1 wherein:

the electrode arm comprises a vertical support, and a rotating member, and a clamp;

the vertical support is arranged vertically on the bottom plate;

the rotating member can be moved in a vertical direction; and the rotating member can turn around a rotation axis which is vertical and which is fixed with respect to the bottom plate.

8. The electrode holder of claim 7, wherein the rotation axis of the rotating member runs through the center of the circle on which the more than one coupling structure for mounting the container or sachet holder are arranged.

9. The electrode holder of claim 7, wherein:

the electrode arm comprises a rotating base which is connected with the rotating member through a rotating structure defining the rotation axis of the rotating member; and the rotating base is guided by the vertical support.

10. The electrode holder of claim 9, wherein:

the rotating structure is a double-bearing rotating structure which includes a first bearing, a second bearing and a positioning member;

the first bearing is installed between the rotating base and the rotating member;

the second bearing is installed in the rotating member; and the rotating member and the rotating base are connected through the positioning member, in such a way that during the rotating process of the rotating member, the positioning member and the rotating base are kept fixed with respect to each other.

11. The electrode holder of claim 9, wherein:

a multi-point positioning structure is provided between the rotating base and the rotating member; and the multi-point positioning structure defines one coordinate of multiple, predefined, specific measurement positions.

12. The electrode holder of claim 11, wherein the multi-point positioning structure comprises:

a mounting hole provided on the lower end surface of the rotating base;

a positioning component provided in the mounting hole; and a plurality of positioning holes surrounding the first bearing on the surface of the rotating member;

wherein the positioning component is capable of engaging with every one of the positioning holes one at a time.

13. The electrode holder of claim 12, wherein:

the positioning holes and the rotating member are integrally formed by injection-molding; or the positioning holes are openings in a positioning plate, and the positioning plate is mounted on the rotating member.

14. A set comprising:

the electrode holder of claim 1; and at least one container or sachet holder for use with the electrode holder, comprising:

a cylindrical compartment which is open on an upper side and closed on a bottom, suitable to receive a sachet or a liquid; and a second coupling structure arranged on the bottom of the container or sachet holder which can be coupled to the at least one coupling structure in the bottom plate;

wherein the container or sachet holder is removably mounted to the bottom plate by the interaction of the first coupling structure and the second coupling structure.

15. The set of claim 14, wherein:

the electrode holder comprises more than one coupling structure for mounting the container or sachet holder to it;

more than one container or sachet holder is removably mounted to the more than one coupling structure of the electrode holder; and the coupling structures and the container and/or sachet holders mounted to it are arranged and dimensioned such that measurement positions are on a circle with a center being on the rotation axis of the rotating member.

16. An electrode holder, comprising:

a bottom plate which is positionally fixed and comprises one or more coupling structures for mounting containers or sachet holders to the bottom plate, each in a respective defined, fixed position on the bottom plate; and an electrode arm which is movable relative to the bottom plate and comprises a clamp to hold an electrode such that the electrode held by the clamp is guidable to a respective one of the mounted containers or sachet holders at the bottom plate.

* * * * *